United States Patent [19]

Pray

[11] 4,333,217
[45] Jun. 8, 1982

[54] APPARATUS FOR STAPLING BELT

[75] Inventor: Winston C. Pray, Lombard, Ill.

[73] Assignee: Flexible Steel Lacing Company, Downers Grove, Ill.

[21] Appl. No.: 938,893

[22] Filed: Sep. 1, 1978

[51] Int. Cl.³ .............................................. B23P 11/00
[52] U.S. Cl. .................................. 29/243.51; 227/30; 227/152
[58] Field of Search ............. 29/243.5, 243.51, 243.56; 227/30, 124, 151, 152, 155; 269/236, 254 CS

[56] References Cited
U.S. PATENT DOCUMENTS

| | | | |
|---|---|---|---|
| 3,101,481 | 8/1963 | Neale | 29/243.51 |
| 3,261,085 | 7/1966 | Hobson | 29/243.51 |
| 3,581,350 | 6/1971 | McComb | 29/243.51 |
| 4,111,080 | 9/1978 | Pray | 29/243.51 |

*Primary Examiner*—James L. Jones, Jr.
*Attorney, Agent, or Firm*—Fitch, Even, Tabin

[57] ABSTRACT

An applicator unit is provided for fastening a plurality of sizes of belt fasteners to a belt by staples being guided and clinched by the apparatus. A staple guide block means is provided with fastener engaging and positioning portions which are shiftable relative to an underlying anvil means to accommodate different sizes of fasteners. To provide better belt penetration and to alleviate breakage of the central bridging portions of the staples, the bending surfaces in the anvil means bend the staple legs partially through a predetermined angle and substantially short of a horizontal position parallel to the lower plate of fasteners. An ejector means is provided to lift the belt end and the bent staple legs from the bending cavities in the anvil means. A common actuating and locking means may be employed for a plurality of units.

15 Claims, 19 Drawing Figures

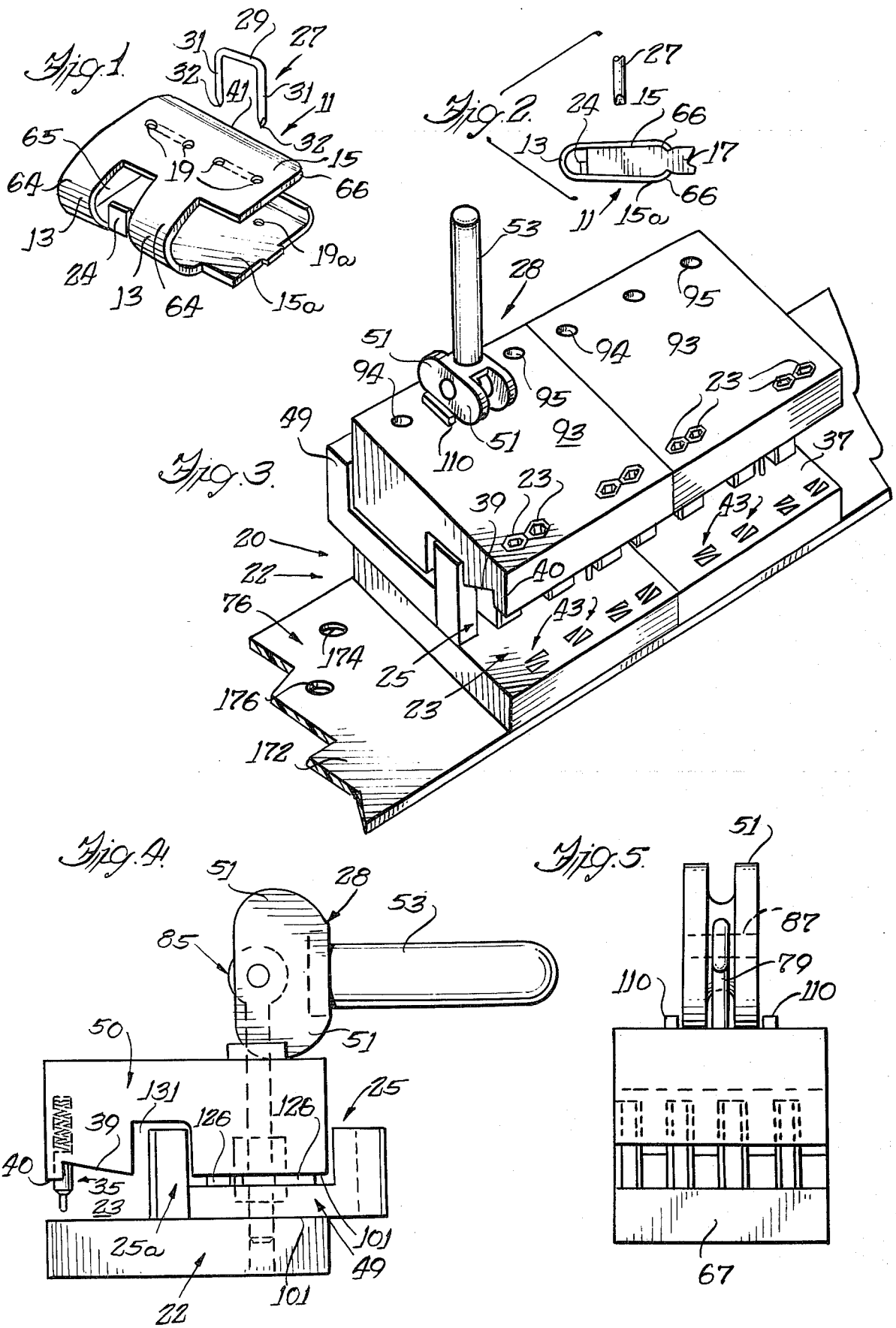

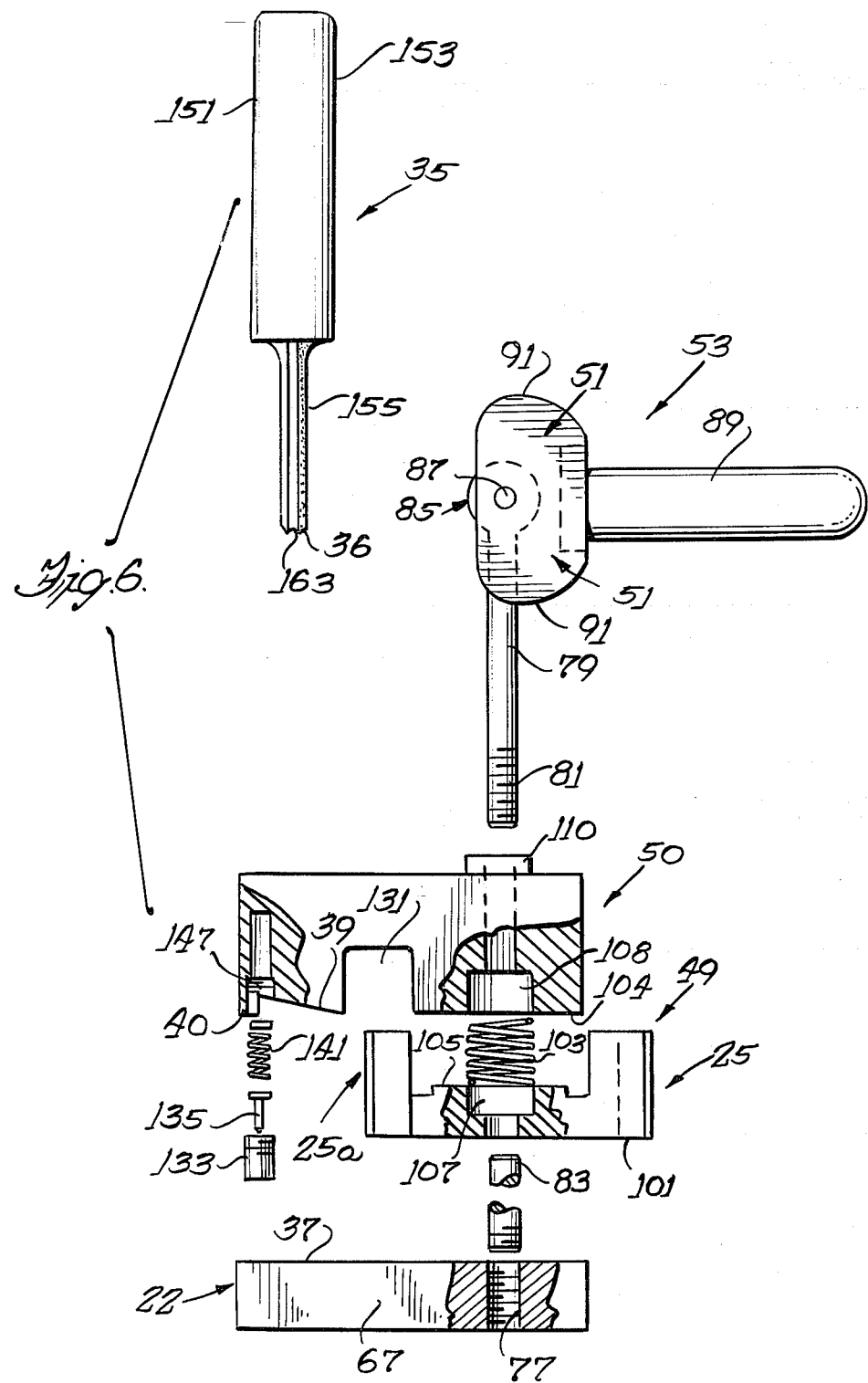

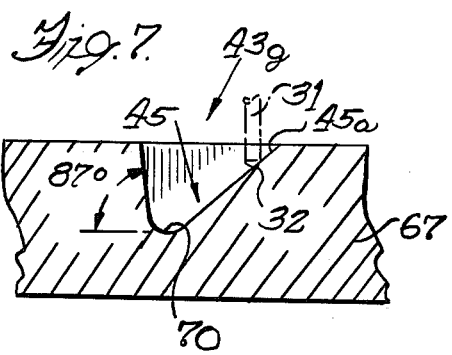
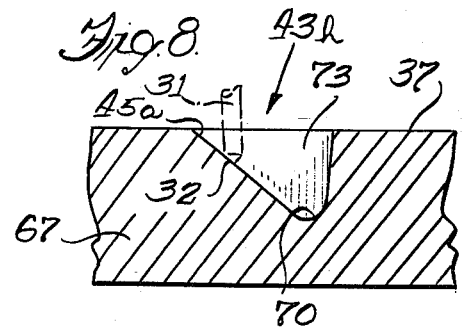
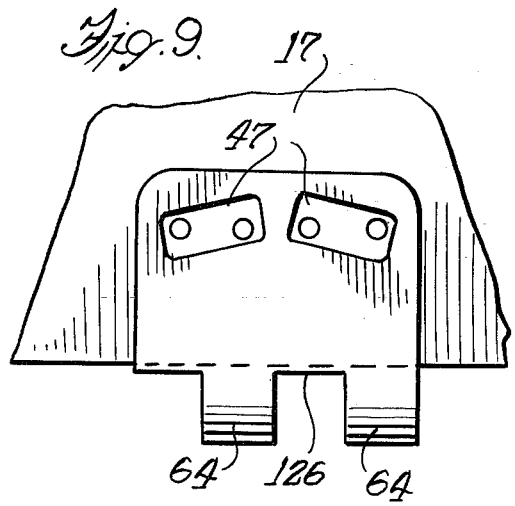
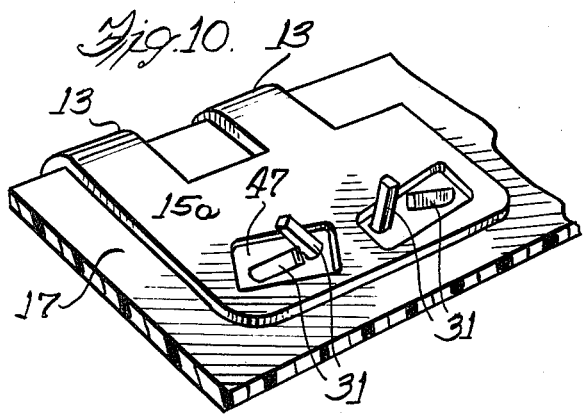
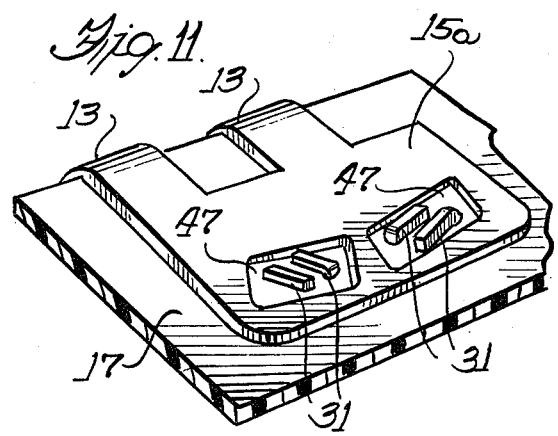

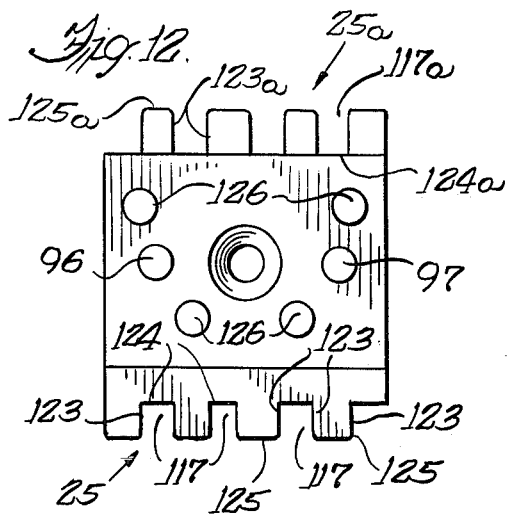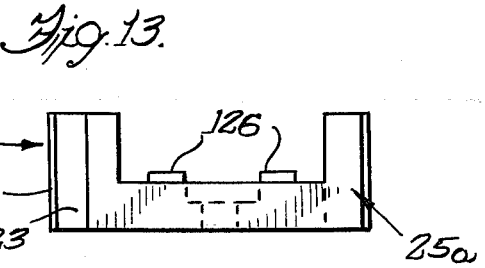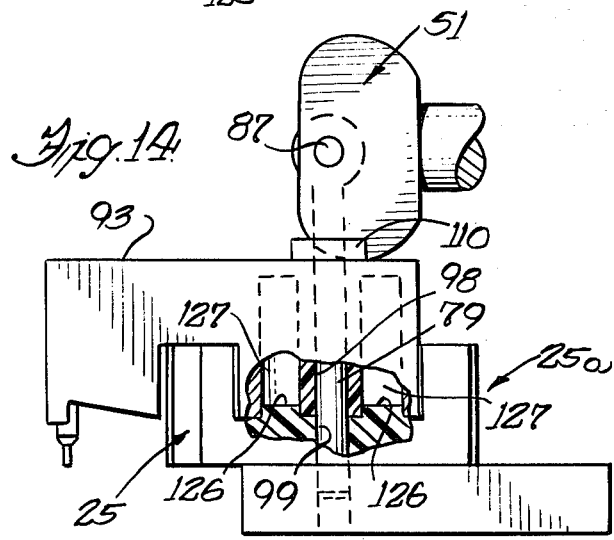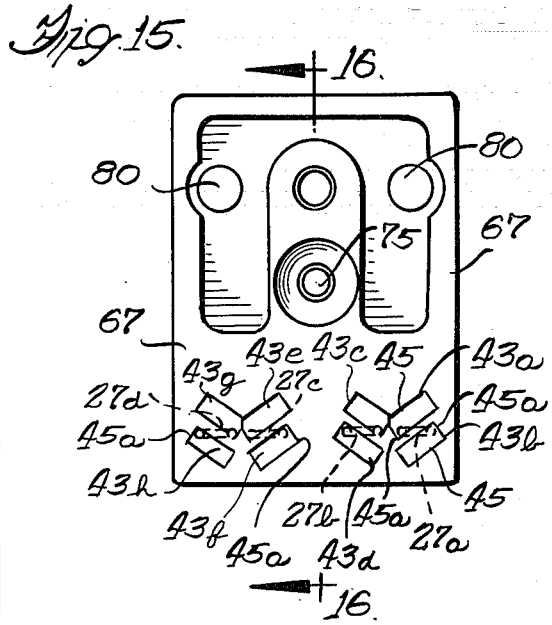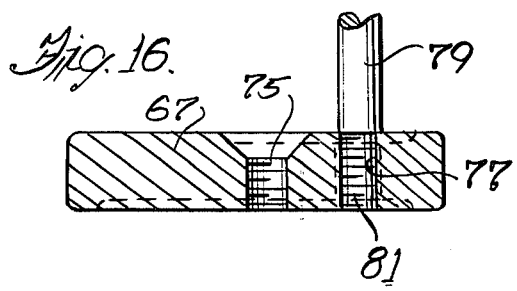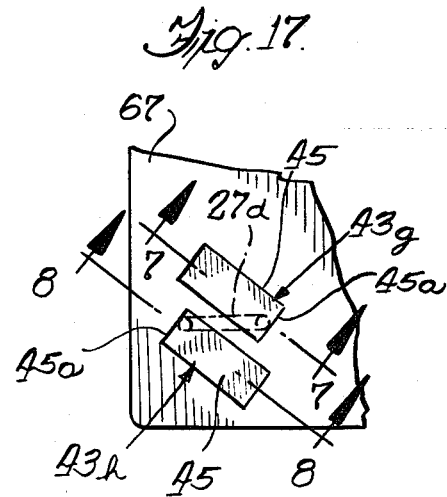

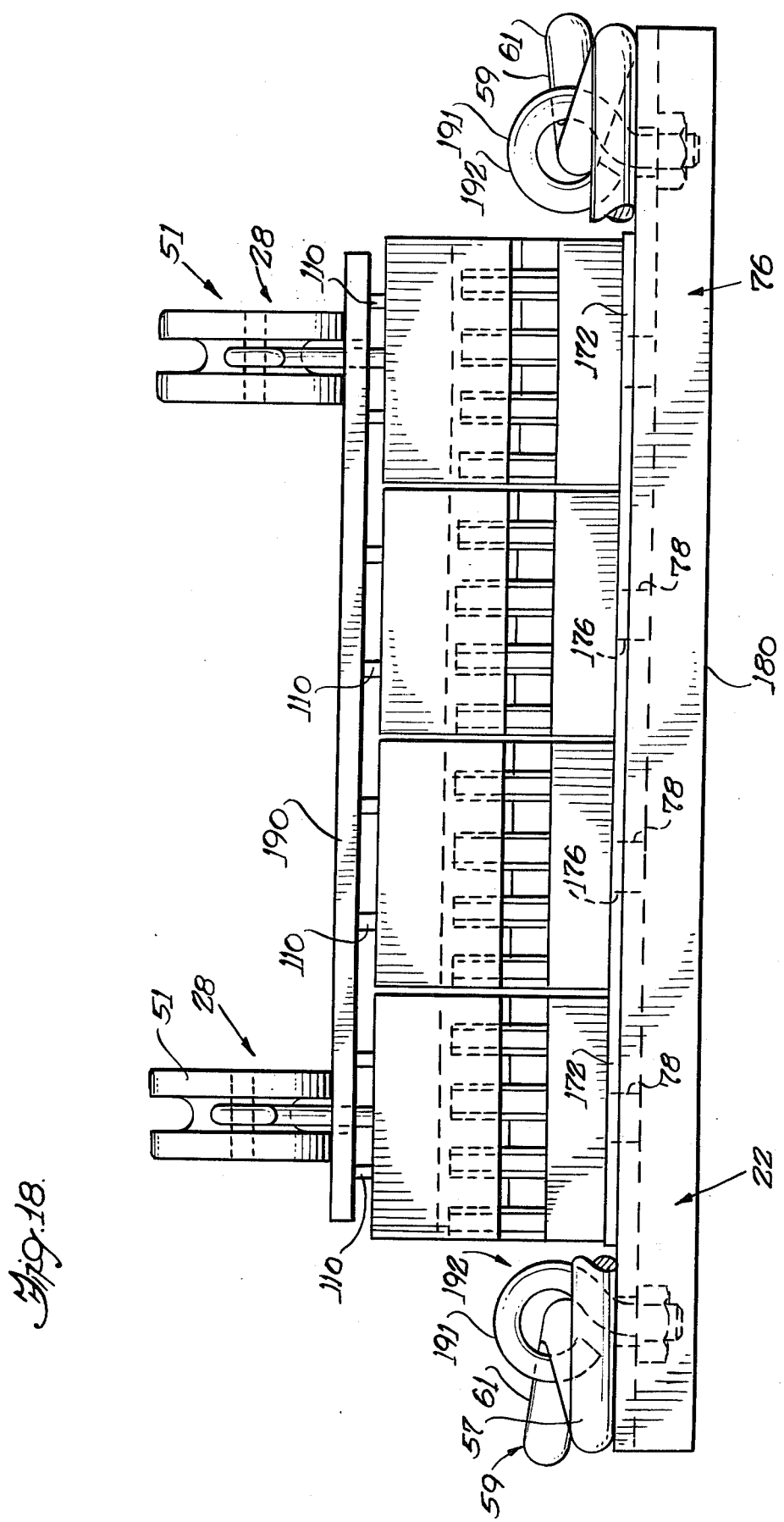

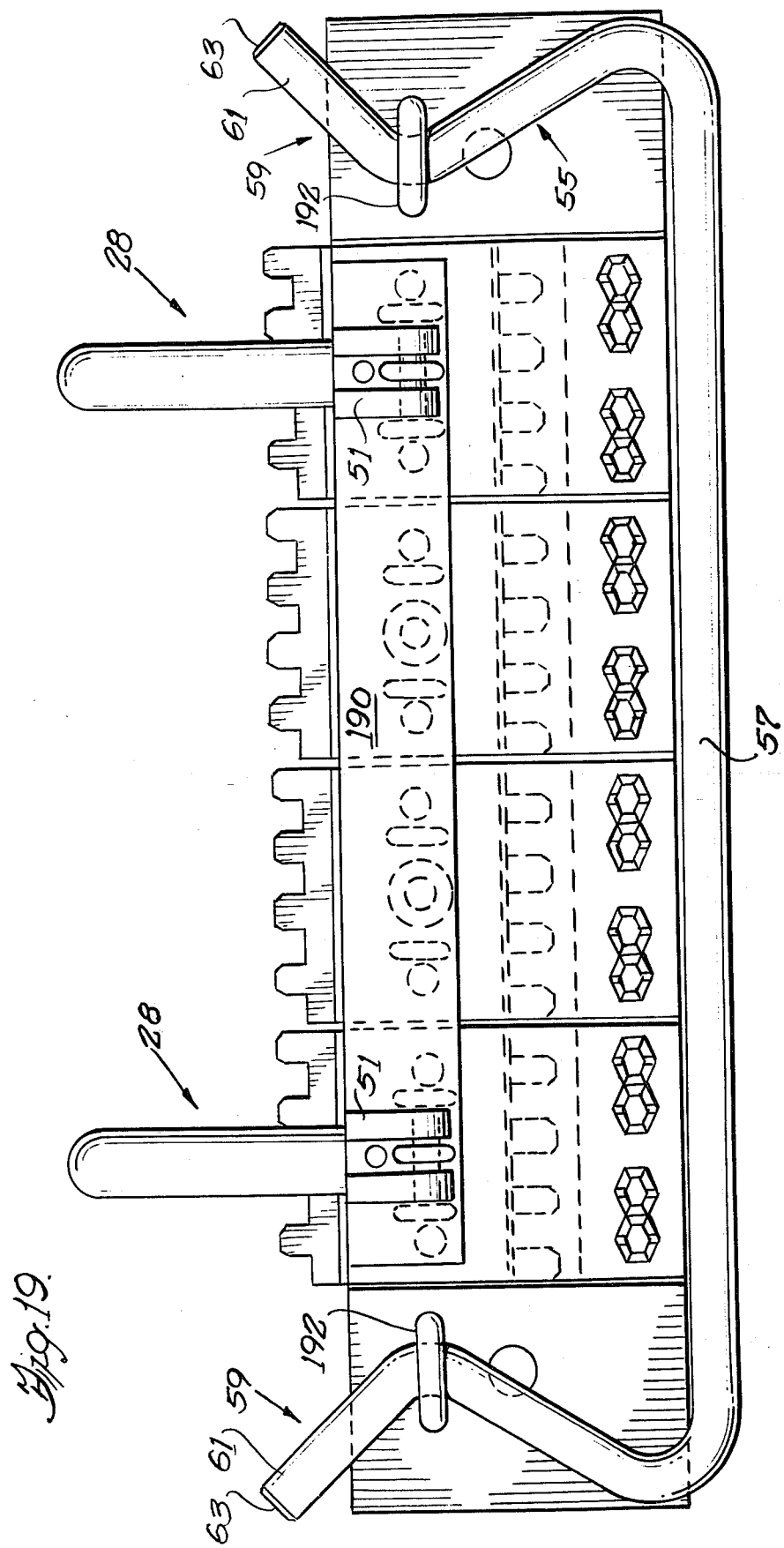

APPARATUS FOR STAPLING BELT

This invention relates to an apparatus for stapling belt fasteners to the ends of flexible belts such as conveyor belts and more particularly to securing by staples U-shaped hinge fasteners having upper and lower plates against the opposite sides of the belt.

The present invention is an improvement over that disclosed in U.S. patent application Ser. No. 765,788, filed Feb. 4, 1977, entitled "STAPLE FASTENING TOOL", now U.S. Pat. No. 4,111,080. The aforesaid staple fastening tool includes an upper staple guide block means mounted over an anvil and movable relative thereto between an open position in which belt fasteners are inserted between the guide block and the anvil and a belt end is positioned between the plates of the belt fasteners. By turning a cam lever handle, the guide block means is forced downwardly into a closed position holding and locating the hinge fasteners with the belt disposed between the upper and lower plates of the U-shaped hinge fasteners. A staple is inserted into each of the staple receiving channels in the guide block means with the pointed ends of the staples projecting through openings in the upper plate fasteners. A staple driving tool is driven downwardly through the channels to drive the legs of the fastener through the aligned holes in the upper plate of the fastener and the belt into aligned holes in the underlying plate of the fastener laying on the anvil. Continued force by the driver caused the legs of the fastener to be bent to positions parallel to one another by inclined walls in the anvil means. During this bending and clinching of the staples, resilient and biased pin means on the upper guide block means clamped the belt during the clinching process to keep the belt in position within the belt fasteners. To provide the final clinching of the parallel staple ends, and a flattening thereof into grooves on the undersides of the fastener plates, the staples were hit with a hammer.

Although the above described staple fastening tool has performed generally satisfactorily, it is desired to improve its performance, particularly in the areas of improved clinching of the staples to the belt fasteners and the elimination of the broken bridge or central portion of the staple between the legs. That is, in some instances, the central U-shaped portion of the staple which is receiving the driving force by the driver tool shears from the staple legs. Further, the aforesaid staple fastening tool is usable only with one particular size of fasteners and it is particularly desirable that the same tool or apparatus be capable of clinching several sizes of fasteners. This eliminates the need for stocking a separate apparatus for each fastener size. Although the belt fasteners differ in height, width and length, they must be positioned accurately with respect to the anvil surfaces and the staple receiving channels and must be in precise positions during the application of the force to drive the staples through the belt and into the underlying openings in the lower plate. Hence, it is important that the relationships be maintained fairly exactly when switching from one size of fastener to another size of fastener.

Accordingly, a general object of the invention is to provide a new and improved apparatus for stapling belt fasteners to belt ends.

Another object of the invention is to provide a belt fastening apparatus which may be used for several different sizes of belt fasteners.

Other objects and advantages of the invention will become apparent from the following detailed description taken in connection with the accompanying drawings in which:

FIG. 1 is an enlarged perspective view of a conventional hinged belt fastener and staple for application to a belt end with the apparatus shown in FIG. 3.

FIG. 2 is a side elevational view of a belt end to which the belt fastener is being attached by staples.

FIG. 3 is a perspective view of an apparatus for applying belt fasteners and staples to a belt end and constructed in accordance with the preferred embodiment of the invention.

FIG. 4 is a side elevational view of an apparatus for fixing a belt fastener by staples to a belt end.

FIG. 5 is an end view of the apparatus shown in FIG. 4.

FIG. 6 is an exploded elevational view of the apparatus shown in FIG. 4.

FIG. 7 is an enlarged sectional view taken substantially on the lines of 7—7 of FIG. 17.

FIG. 8 is an enlarged sectional view taken substantially along the lines of 8—8 of FIG. 17.

FIG. 9 is a plan view of a belt end having a fastener prior to being stapled.

FIG. 10 is a bottom view of a belt fastener having the staples partially bent by the apparatus of FIG. 3.

FIG. 11 illustrates the bent fastener as being flattened into a flat condition against the lower plate of the belt fastener.

FIG. 12 is a plan view of the lower block of a guide block means.

FIG. 13 is a side elevational view of the lower guide block shown in FIG. 12.

FIG. 14 illustrates the lower guide block positioned to clamp a belt and belt fasteners and for receiving the staples.

FIG. 15 is a plan view of an anvil means constructed in accordance with the preferred embodiment of the invention.

FIG. 16 is a cross-sectional view taken substantially along the line 16—16 of FIG. 15.

FIG. 17 is an enlarged fragmentary corner view of a portion of an anvil means.

FIG. 18 is a front elevational view of an apparatus having four units for clamping belt fasteners; and FIG. 19 is a plan view of the apparatus of FIG. 18.

In accordance with the invention shown in the drawings for purposes of illustration, the preferred apparatus is used with generally U-shaped hinge type fasteners 11 which are formed with an upper leg or plate 15 and a lower plate 15a integrally joined by a U-shaped end portion 13. An end of a belt 17 is inserted between the upper and lower hinge plates 15 and 15a, as best seen in FIG. 2, until the belt end abuts upwardly projecting tabs or stops 24 on the belt fasteners, as can readily be seen in FIG. 2. This leaves an opening in the U-shaped end portions 13 for receiving a hinge pin (not shown). Staples 27 are provided with a pair of dependent, pointed legs 31 and a central bridge 29 with the legs of the staple being driven through a pair of openings 19 in the upper plate 15 and then through the body of the belt 17 and into and through the pair of underneath openings 19a in the lower plate 15a of the belt fastener.

The staple fastening apparatus herein comprises, as did the aforesaid staple fastening tool, an upper guide block means 20 positioned over an anvil means 22 and defining therewith an open channel 23 into which are inserted the belt fasteners 11, as best seen in FIG. 10. Each of the central U-shaped end portions 13 are disposed in mating relationship with alternating slots in a rearward locating wall 25 of the guide block means 20. The inclined upper plate 15 is engaged and positioned by an inclined wall 39 on the guide block means overlying the upper plate and a depending lip 40 at the forward edge of the inclined wall 39 abuts the free end 41 of the upper fastener leg 15. The lower leg 15a of the belt fastener rests on the striking surface 37 of the anvil means. After a belt is inserted between the fastener legs 15 and 15a, cam lock means 28 is pivoted to force the guide block means downwardly to close the bight between the legs of the belt fasteners and to bring a depending pin means 33 on the forward edge of the guide block means into clamping engagement with the belt thereby holding the belt 17 against shifting during the staple application.

To accurately locate the staples 27 and to hold them during stapling, the lower ends of ends of the staple legs 31 are inserted into staple guiding shafts or channels in the guide block means 20 to slide down until the pointed ends 32 of the staple legs pass through the holes 19 in the upper fastener wall 15 to contact the belt 17. A staple driver 35 is positioned over the top of the staple bridges 29 and a driving force therefrom to the bridges 29 drives the pointed ends 32 through the belt thickness and the underneath holes 19a in the lower fastener plate 15a and into bending cavities 43 in the anvil means 22. In the aforementioned staple fastening tool, the bending cavities 43 bent the staple legs toward one another and into a generally parallel position parallel to the lower fastener plate 15a which rests on the upper horizontal striking surface 37 of the anvil means 22.

After turning the cam lock means 28 to the release position, the guide block means 20 raises to the release position allowing the stapled belt fasteners to be removed from the channel 23 between the guide block means and the anvil means.

The disclosure of co-pending U.S. patent application Ser. No. 765,788 now U.S. Pat. No. 4,111,080 is hereby incorporated by reference as if fully reproduced herein and reference may be had thereto for a more detailed description of the staple fastening tool described therein.

It has been experienced that with the aforementioned staple fastening tool, that bridges were broken by the staple driver, particularly where the point ends of the staples were being driven through a hard belt. It appears that the legs of the staple meet such resistance that when the staple pointed ends engaged the inclined surfaces within the bending cavities 43 that the continued application of the force would cause the staple legs to bow in the center portions rather than to be deflected at their lower ends such that the continued driving force to the bridges shears the latter from the legs. The angle for the inclined surface in the staple fastening tool was about 32 degrees to the horizontal and it extended downward for about 0.060 inch to a flat, horizontal surface. Irrespective of what caused the bridges to break, the breaking of the bridges constituted a real problem. In addition, it was found that the height adjustment of the guide block means 20 was not as fine, as desired, with one full turn of a handle for the cam lock means being required for each adjustment. Also, as explained above, it was desired to improve the versatility of such tools by adapting it to be used with a plurality of sizes of belt fasteners.

In accordance with the present invention, the breaking of the staple bridges 29 during staple application has been alleviated by providing an improved anvil cavity means 43 which has an inclined deflecting surface 45 at an angle less than the 32° angle used heretofore within the bending cavity and further by not deflecting the ends into parallel relationship with the lower plate 15a while within the cavities 43. Herein, the staple ends are deflected only about halfway from the horizontal and are quite visibly protruding from the lower plate rather than being bent back parallel into a cavity or cup 47 formed on the underside of the fastener leg 15a. The 32° angle for the inclined surface 45 was increased to about 38° so that the pointed ends may more easily cam and slide down the surface thereof and the deflecting surface 45 is extended sufficiently deep that the pointed staple ends 32 do not contact a flat bottom surface in the manner disclosed and used in the prior art stapling tool. A secondary and later operation is performed to finally bend the lower ends of the legs 31 into parallel relationship within the cups 47 of the fastener legs.

Also, in accordance with another important aspect of this invention, the apparatus is usable for two different sizes of fasteners 11, only one being illustrated herein. To this end, the guide block means 20 is shifted relative to the anvil means 22 to relocate the locating surfaces which locate the fasteners at their predetermined positions relative to the staple receiving channels 23 and the bending cavities 43 in the anvil means. The preferred and illustrated means for effecting such a change is to separate the guide block means 20 into two separable portions 49 and 50 which can be repositioned relative to one another and the anvil means to relocate the locating walls 25, 39 and 40. Herein, the depending lip 40 which engages the front free edge of the upper fastener plate and the inclined wall 39 move vertically relative to the anvil surface 37 and to the rearward locating wall which shifts horizontally either toward or from the staple bending cavities 43. In the preferred embodiment, the lower guide block 49 has two locating walls 25 and 25a located on opposite ends of the lower guide block 49 and, when the lower guide block is turned through 180°, it presents one of these walls in an effective position facing the bending cavities 43. When first matching surfaces on the upper and lower portions are in engagement, the inclined locating wall 39 and lip 40 are at a first height above the anvil striking surface 37. However, when the lower guide block 49 is turned 180°, different surfaces are engaged to change the vertical location of the inclined locating wall 39 and lip 40 relative to the anvil surface 37.

In accordance with a further embodiment of the invention, which is not illustrated herein, the guide block means 22 is divided into a pair of laterally slidable upper and lower guide block portions with the lower portion being slidably mounted on the anvil means for shifting fore and aft between a position closer to the anvil receiving bending cavities 43 and a position further from these bending cavities 43 while simultaneously causing the upper portion of the block means to be raised or lowered relative to the anvil means to adjust for the difference in height of the two types of fasteners being employed herein. Preferably, a lock means holds these portions in their adjusted positions.

In accordance with a further aspect of the invention, the cam lock means 28 is formed with a pair of oppositely disposed locking cams 51 which allow the operating handle means 53 of the cam lock to be turned to a horizontal position, as shown in FIG. 4, to its locking position after turning through 180° rather than the 360° or one full turn required for the previously described staple fastening tool. Thus, it is possible to adjust more closely the height of the guide means 20 for the particular thickness of belt and belt fasteners being used.

When the staple ends 32 remain pointing downwardly in the bending cavities 43 rather than being bent parallel and flat as in the prior art, some difficulties result in removing a wide belt end from a plurality of units, such as the four units shown in FIGS. 18 and 19 because sixteen staples have ends engaging walls of the cavities 43. This problem has been overcome by an ejector means 55 which serves to lift the staple ends from the bending cavities 43 allowing the belt and belt fasteners to be readily removed from the apparatus. More specifically, the preferred ejector means comprises a bar 57 located beneath the belt and the belt fasteners for raising into engagement with the undersides thereof to apply a lifting force to the belt end 17 to lift the staple ends from the cavities 43. It is found without the ejector device that particularly for the wider length of the belt that the turning of the handle to the release position and the lifting of the guide block means 20 still does not allow an easy removal of the staple ends from the cavities. It is decidedly easier to remove the belt where the ejector means is used to having a mechanical advantage to force the belt upwardly. Herein, the preferred bar 57 is a central portion of a larger manually operated pivotally mounted level member 59 having crank portions 61 thereon. By grasping one end 63 of the member and forcing the end down, the lever member pivots on the anvil means 22 to lift the bar and eject the staple ends from the bending cavities 43.

A detailed description of the belt fasteners and the individual elements of the illustrated embodiment of the invention will now be given. The illustrated fasteners 11 are a hinge type of fastener formed with a pair of rear U-shaped ribs 64 which integrally connect the upper and lower plates 15 and 15a and define with the belt end 17 an elongated groove into which will be inserted a hinge pin. Slots 65 are defined between adjacent ones of the ribs 64 and into these slots are projected the ribs 64 of the belt fasteners 11 fastened to the other end of the belt, all as is well known in the art. Preferably, the outboard ends 66 of the upper and lower plates 15 and 15a are inclined toward one another out of the planes of the plates to clinch into the surface of the belt, as best seen in FIG. 2.

The elongated staples 27 are generally small pieces of wire which have been bent into the generally U-shaped form illustrated with the legs 31 having sufficient length to penetrate through the fastener walls 15 and 15a and to be bent over into parallel relationship within the grooves or cups 47 formed in the underside of the lower fastener plate 15a. It has been found that with the improved anvil means 22 used herein that the staple legs 31 may be driven further into the belt allowing them to be used with thicker belts than heretofore. This improved driving of the staple legs into and through the belt provides a better clinching than heretofore experienced with the above described staple fastening tool.

The anvil means 22 comprises a metallic plate 67 having the upper striking surface 37 thereon being perforated by the bending plate cavities 43, there being eight bending cavities in each anvil plate 67. The bending cavities are arranged in fore and aft pairs, each cavity receiving one leg of a staple for bending the same. For instance, the fore and aft bending cavities 43a and 43b on the right side of the plate, as viewed in FIG. 15, receive the legs of one staple being diagrammatically illustrated and designated by reference character 27a. The staple legs are parallel with one another with the pointed lower ends 32 each being guided to contact an inclined slot wall 45 near the uppermost edge 45a of the wall and to be bent out of a plane parallel to one another into a side-by-side relationship and also to be deflected from a substantially vertical position to a position of about 38° to the horizontal. Herein, as best seen in FIGS. 7 and 8, each of the bending cavities has its inclined bending wall or surface 45, which is at the preferred angle of between about 35° to 40°, with a 38° angle to the horizontal being preferred. This inclined bending wall 45 receives the point of the staple up near the top edge 45a thereof and as a continuing force is being applied to the staple, the lower ends 32 of the staple are deflected to slide downwardly and inwardly toward the bottom 70 of the anvil cavity, which, in this instance, is disposed sufficiently far beneath the staple ends 32 that the bottom 70 is never contacted by a staple end 32. This is in contrast to the prior art anvil means in which the bottom wall actually engaged and deflected the pointed end to finish bending the staple legs 31 into the generally parallel position within the cup 47 in the fastener plate 15a substantially in the manner shown in FIG. 11. With the present invention, however, the bent staple legs 31 protrude beneath the fastener plate 15a, as best seen in FIG. 10, when the belt is removed from the illustrated apparatus.

As described above, the ends 32 of the first staple 27a, which is shown in FIG. 15, are deflected by the pair of bending slots 43a, and 43b; the ends 32 of the next staple 27b are deflected by the next pair of bending slots 43c and 43d; the ends 32 of the third staple 27c are deflected by the next pair of bending slots 43e and 43f; and the ends 32 of the fourth staple 27d are deflected by the next pair of bending slots 43g and 43h. The bending slots 43g and 43h are shown in an enlarged form in FIG. 17 and FIGS. 7 and 8 show the configuration for each of the bending slots 43.

To assist in ease of removal of the staple ends 32 from the bending cavities 43, it is preferred that the other end wall 72 opposite the inclined wall 45 not be at a right angle but be at an angle of approximately 87° to the horizontal, as best seen in FIG. 7. By way of example, for the size of the staples herein described, the length of the cavity at the top thereof is about 0.310 inch. There are two other opposite vertical sidewalls 73 which define the sides of the cavity and they are spaced apart about 0.146 inch. In contrast to the narrow depth of about 0.060 inch used for the prior art cavities, it is preferred to make the depth about 0.194 inch in this illustrated embodiment of the invention.

As disclosed more fully in the aforesaid patent application and as illustrated in FIGS. 3, 18 and 19, a series of units may be mounted side by side to provide the cumulative length desired for a given belt width. Preferably, the units are releasably secured in their side-by-side relationship to a common base means 76 (FIGS. 3, 18 and 19). The threaded ends of suitable bolts (not shown) are inserted through openings 78 in the base means and threaded into the underside of the anvil plate 67 which has a threaded bore 75 (FIG. 16) to receive the bolt end. Additional bores are formed in the anvil plate 67, as best seen in FIG. 15. More specifically, another threaded bore 77 is formed in the anvil plate 67 to receive a threaded elongated lock pin 79 (FIGS. 6 and 16) having one of its ends 81 threadably received in the threaded bore 77. Extending from the impact surface of the anvil and essentially parallel to the locking pin 79 is a pair of vertically extending orienting posts 83 which have lower ends inserted into bores 80 (FIG. 15) and fastened at their lower ends to anvil plate 67. The outboard end of the lock pin terminates at a height above the anvil surface 35 greater than the thickness dimension of the guide block means 22.

Pivotally attached to the outboard end 85 of the lock pin 79 by means of a pivot pin 87 is a cam lever handle 89 of the handle means 53. The pair of locking cams 51 each comprises a generally oval cam 91 and an integrally attached lever or handle 89 which, through rotation, causes the cam to roll on the top of guide block means and thus control the effective distance between the anvil surface 37 and locating surfaces on the guide block means.

The guide block means 22 is slidably mounted upon the orienting posts 83 for sliding motion, without wobbling. Because the guide block means 22 is divided into separable upper and lower portions 49 and 50, the orienting posts 83 and the locking pin 79 extend through aligned bores in each of the upper and lower portions 49 and 52. More specifically, the orienting posts 83 are received in a pair of vertical and cylindrical orienting bores 94 and 95 passing through the depth of the upper guide block portion and are received in a pair of aligned bores 96 and 97 (FIG. 12) in the lower guide block portion 49. The locking pin 79 likewise extends through a vertical bore 98 in the upper guide block 50 and an aligned bore 99 (FIG. 14) in the lower block portion 49. The diameter of the lock pin bores and the orienting bores, respectively, are sized slightly larger than the diameters of the respective lock pin 79 and orienting pins 83 to allow sliding motion therebetween without wobbling of the guide block portions 49 and 50 relative to the anvil means 22. When the guide block means 22 is mounted upon the orienting pins 83 and lock pin 79, the lower surface 101 of the lower portion 49 faces the impact surface 37 of the anvil plate 67.

The staple shafts or channels 23 are preferably generally perpendicular to the impact surface 37 of the anvil plate and positioned in register with the bending cavities 43 in the impact surface 35 when the upper guide block portion 50 is in the closed position. The cross-sectional shape of the staple shafts is generally diamond-shaped, one axial dimension of the diamond being parallel to an inserted belt end and slightly larger than the length of the staple bridge 29 to allow sliding motion of the staple 27 through the shaft 23 yet maintain the legs 31 of the staple essentially parallel to the shaft axis. As will be described more fully hereinafter, a diamond-shaped shaft allows structural strength for the driving column 36 which has a diamond cross-section shaped to pass slidably therethrough.

As noted previously, attached to the lock pin 79 adjacent the top wall 93 of the guide block means 20 are the oval-shaped locking cams 51. Contact between one of the cams and the top wall 93 is preferably maintained through biasing action of a coil spring 103 (FIG. 6) which is disposed around the lock pin 79 between a lower surface 104 of the upper guide block portion 50 and a mating upper surface 105 on the lower guide block portion 49. This same spring further biases the upper guide block portion 50 upwardly relative to the anvil plate 67 to leave an open space in which to insert the belt fasteners. The spring 103 is received in facing cylindrical cavities 107 and 108 and is compressed therein when the locking cam 51 forces the facing surfaces 104 and 105 into abutment and forces the lower wall 101 of the lower portion 49 against the anvil surface 37.

To guide and align the locking cams 51, a pair of elongated stabilizing lugs 110 extend generally perpendicularly from the guide block top wall 93 to receive therebetween the cams 51. The lugs 110 are spaced apart to receive the cams therebetween to prevent inadvertent rotation of the cam lever handle 89 and attached lock pin 79. As noted above, such rotation adjusts the distance between the anvil impact surface 37 and the guide block inclined locating wall 39 by reason of the threaded attachment of the lock pin 79 to the anvil plate 67. Accordingly, once the lock pin has been rotated to the desired height above the anvil surface and the cam rotated to move the guide block means to its closed position, the cam lever is received between the lugs 110 and locked against further rotation of the lock pin. The rotational position of the lock pin is maintained by the lugs even when the guide block is in its open position.

The fasteners 11 are gripped after insertion of the staples 27 into a channel 23 to generally U-shaped cross section between the lower anvil impact surface 37 and the upper guide block portion's inclined wall 39. While nonplanar surfaces may be provided in both the anvil plate 37 and the guide block portion 49, it is preferred that the anvil impact surface 37 be substantially planar to provide a lower channel wall 114 that defines one leg of the generally U-shaped channel and on which rests the lower side of the fastener plate 15a.

The rearward locating wall 25 for the U-shaped cross-sectional channel 23 is preferably a vertically grooved or slotted wall formed on the lower guide block portion 49 to receive therein the spaced rearwardly projecting ribs 64 on each fastener 11. Herein, the slotted wall 25 is disposed generally perpendicular to the anvil impact surface 37. A plurality of alternating slots 117 (FIG. 12) is provided in this slotted wall to matingly receive the alternating ribs 64 in the fastener 11 and prohibit lateral motion of the fastener 11 within the channel 23. Each of the slots 117 is defined on their sides by vertical side walls 123 and a rear vertical wall 124 meeting the side walls at right angles. Between the alternating slots 117 are upstanding forward walls 125 which will abut inner surfaces (FIG. 9) on the fasteners between the fastener ribs 64. With the fastener ribs 64 inserted in the alternating slots 117, these side walls 123 prevent lateral shifting of the fastener ribs and the walls 124 and 125 prevent rearward sliding of the fasteners along the anvil surface 37.

As previously explained, in this preferred embodiment of the invention, a second slotted wall 25a is formed on the opposite end of the lower guide block portion 49 and it likewise has alternating slots 117a defined by parallel side walls 123a and rear vertical walls 124a, the slots being separated by front vertical walls 125a. When the lower guide block 49 is rotated through 180° and reinserted onto the orienting posts 83, the alternating slots 117a will thus be facing into the channel 23 and the alternating slots 117 will be facing outwardly from the rear wall 118 of the guide block means 22. By way of example, the guide slots 117a and 117 may be 0.234 inch in width and the spacing between adjacent slots is about 0.216 inch. Thus, the two sizes of fasteners 11 have identical width ribs and spacing between ribs. It is the location and depth of the slots, however, which differs between the two sizes of fasteners. The rear slot walls 124 for the smaller size fastener are located at 0.875 inch from the centerlines of the bores 96 and 97 receiving the orienting posts 83 versus a 0.656 inch dimension for the rear slot walls 124a from the centerlines of these same bores 96 and 97. Also, the depth of the slot may vary from about 0.239 inch for the smaller size of fasteners received in the slotted wall 25 to a 0.325 inch depth for the larger fasteners received in the slotted wall 25a.

To adjust the vertical position of the inclined locating wall 39 on the upper guide block 50 for the differing heights of fasteners, the upper and lower guide blocks 49 and 50 have different surfaces abutted depending on which way the lower block portion is facing, in this preferred embodiment of the invention. For the smaller size fasteners, the lower surface 104 of the upper guide block portion rests in face-to-face engagement with the top surface 105 of the lower guide block portion 49 and with upstanding cylindrical lug spacers 126 (FIGS. 12 and 13) on the block 49 projecting into aligned openings 127 (FIG. 14) in the upper block 50, as best seen in FIG. 14. On the other hand, when the lower guide block is turned to present the alternating slots 117a for the larger fasteners as shown in FIG. 4, the lug spacers 126 are no longer aligned with the openings 127 and the lower surface 101 of the upper guide block 50 rests on the tops of the lug spacers 126 and hence the upper block portion is raised by the height of the lugs, which height is about 0.079 inch in this instance. Herein, four lug spacers are provided with the pair closest to the alternating slots 117 being closer together than the pair of spacers located adjacent the locating ribs 117a.

Thus, the upper block 50 and its inclined locating wall 39 are raised or lowered depending upon whether or not the lug spacers 126 are effective or not. The inclined wall 39 is inclined upwardly from its junction with a second channel 131 into which projects the upper portion of the ribbed wall 25 or 25a of the lower block. At the forward and outer end of the inclined wall 45 is the depending lip 40 which abuts the outer free end of the upper plates 15 of the fasteners 11.

The depth of the retainer lip 40 is preferably about one-quarter (¼) inch, which compensates for a small amount of variance in the shape of the fastener 11 as the fastener walls 15 and 15a are pushed from an angular position relative to one another to a generally parallel position.

To grip the belt end 17, a spring plunger pin 135, such as manufactured by Vlier Engineering Corporation of Burbank, Calif., U.S.A., is mounted to depend from the retainer lip 40. This plunger pin 135 extends toward the anvil striking surface 37 and when the tool is in a closed position, the distance from the anvil striking surface 37 to the Vlier plunger pin 135 is such that the pin contacts the belt 17.

The spring plunger pin 135 comprises, as best seen in FIG. 6, a generally cylindrical sleeve 133, a plunger pin 135, and a biasing coil spring 141 for the pin, the construction of such a Vlier pin being described in detail in the aforesaid application. Preferably, the Vlier pin sleeve 133 is forced into a generally cylindrical cavity 147 in the upper guide block portion having a diameter the same as, or slightly smaller than, the outer diameter of the sleeve 133, thus assuring a friction-tight fit of the sleeve 133 with the cavity 147.

For driving the staples, there is provided the driver 35 which includes a generally cylindrical main column 151 (FIG. 6) including a receiving end 153 and a split end 155. Parallel and integrally attached to the main shaft column at the split end 155 is the pair of driving columns 36, each of which is generally diamond-shaped in cross section. These driving columns are spaced-apart to be received in the staple channels 23. The outboard driving end 161 of each driving column includes an elongated groove 163, aligned with the major axis of the diamond-shaped cross section of its respective staple shaft, to receive the staple bridge 29. Thus, the diamond shape allows distribution of a staple-driving force along the entire bridge 29 of the staple 27 and also provides structural reinforcement to prevent deformation of the driving columns 36 when extraordinary forces are applied to the driver 35. On the same hand, this geometrical configuration minimizes the amount of material required in construction of the driver. Also, the diamond-shaped staple shaft maintains a proper orientation of the staple 27 with respect to the holes 19 in the fastener walls 15 and 15a and the bending cavities 43.

In operation, the handle lever 53 is raised to cause the upper guide block portion 50 to move to its open position. A fastener 11 is inserted into the channel 23 to a position in which the alternating slots 117 or 117a in the rearward locating wall 25 or 25a matingly engage the alternating ribs 64 in the fastener and the lower fastener wall 15a rests upon the anvil striking surface 37. A belt end 17 is then inserted between the fastener walls 15 and 15a until the belt end 17 contacts the fastener lugs 25. The upper guide block portion 50 is then moved to a closed position by pivoting the handle lever 53 about 90°, the increasing radius of the cam 51 urging the guide block portion 50 against the bias of the coil spring 103 to a position in which the lower surface 104 of the upper guide block 50 abuts either the upper surface 105 of the lower guide block 49 or the top of lug spacers 126. As the guide block portion 50 approaches the closed position, the Vlier pin 135 contacts the belt 17, partially penetrating the belt and receding into the sleeve 133, against the bias of the coil spring 141. The amounts of penetration and recession depend upon the material of the belt 17, the strength of the biasing spring 141 and the sharpness of the pin's point. It is desirable for the pin 135 to penetrate the belt as far as is possible without damage to the belt. Such a goal is best accomplished by using a dull pin point and a relatively stiff coil spring 141. Such a combination allows use with a wide variety of belts, without consequential damage to lightweight belts nor shifting of heavier belts.

At this point, the fastener 11 is firmly engaged by the upper inclined wall 39, the retainer lip 40 and the slotted rear locating wall 25 or 25a. The lower plate 15a of the fastener 11 rests upon the anvil striking surface 37 and is prevented from being lifted therefrom by the inclined wall 39. Sliding motion within the channel 23 by the fastener is prevented by the mating engagement of the fastener ribs in the alternating slots 117 or 117a.

The belt 17 is prevented from moving by its engagement with the Vlier pins 135. The strength of the spring 141 is sufficient to overcome normal shifting forces applied to a belt during an assembly operation. Preferably, two or more units are mounted side by side so that the belt is prevented from pivoting about pins 135 by a plurality of spaced points of contact therebetween and a strip of attached fasteners 11 having breakaway lines therebetween is disposed within the plurality of side-by-side units.

A staple 27 is then inserted, legs first, into each staple shaft 23, through which it slides until the legs 31 pass through the holes 19 provided in the fastener wall 15 and contact the belt 17. The driver driving columns 36 are inserted into a pair of adjacent shafts 23 and slide freely therethrough until the driving end groove of each engages a staple bridge 29.

A force, such as a hammer blow, is then applied to the driver 35, driving pointed ends of the staples through the belt thickness and through the holes 19a in the fastener wall 15a resting upon the anvil striking surface 37 until the staple base 29 contacts the fastener wall 15 which is slightly upwardly inclined and resting against inclined wall 39. Further driving of the staple 27 forces the fastener wall 15 downwardly from the inclined wall 39 to a position parallel to the other fastener wall 15a, thus causing the outboard ends of the fastener walls 15 and 15a to "bite" into the belt 17.

Meanwhile, the staple pointed ends 32 strike the anvil impact surface 37 at the bending cavities 43. In the latter, the angled formation of the inclined wall 45 causes the pointed end to slide downwardly therealong while bending the staple legs 31 to about the 38° angle of the inclined wall 45. The bottom wall 70 of the bending cavities are preferably so deep that the staple ends 32 do not abut the bottoms when the staple is fully driven.

As shown in FIGS. 3, 18 and 19, several staple shafts 23 are provided in each guide block means 22 to allow several staples to be inserted each time the device is closed. In this illustrated embodiment of the invention, each staple applicator unit is a modular unit which is adapted to be mounted side by side with other units until a desired width is achieved. Herein, each applicator unit is mounted on a common base means 76 (FIG. 18) which comprises an upper flat planar template plate 172 having a pair of holes 174 (FIG. 3) therein precisely located therein on the template for each unit. These holes 174 are sized for a snug, wedge fit with the lower ends of the orienting pins 83 which project through the anvil plate 67 and into the template plate 172. The templates likewise have a third hole 176 (FIGS. 3 and 18) which receives a shaft of a bolt (not shown) which threads into each anvil plate 67. The bolts and dowel pins 83 locate each anvil plate 67 in side-by-side abutted relationship so that the belt fasteners will be aligned to receive the hinge pin through their looped ends. Herein, the base means 76 preferably includes a lower supporting channel 180 (FIG. 18) having a top planar web within openings 78 therein through which extend the bolts with their heads tightened against the underside of the channel web to secure fixedly each anvil means onto the template and to the underlying channel 180. In this manner, dislodgement or shifting problems attendant to moving a belt and fastener joined by only a few staples are minimized.

In the event that a different sized fastener is desired, either for added strength or a belt having a different thickness, the handle lever 53 is rotated to unthread the locking pin 79 from the anvil plate and the guide block means 22 is lifted from the orienting posts 83. The lower guide block portion 49 is then turned through 180° to rotate the then forward locating slots 117 or 117a toward the rear of the guide block means 20. Thus, new mating surfaces will be spacing the guide block portions 49 and 150 to provide a different vertical spacing for the inclined wall 39. By inserting the lower and upper guide blocks, in this new orientation, over the orienting pins 83 and sliding the same downwardly on these pins, the new rearward locating slots and wall will now be spaced at the desired position relative to the retaining lip and the bending cavities 43 in the anvil means 22. The locking pin 79 is then threaded into the anvil plate 67 until the locking cams 51 are disposed in alignment between the lugs 110 on the top of the guide block means 22. The spring 103 is captured between the upper and lower guide block portions and the locking pin 79 extends through the center bore of the coiled spring and is compressed when one of the locking cams 51 is cammed against the upper guide block portion 50.

The preferred material for the upper and lower guide block portions 49 and 50 and handle lever 53 is a fiberglass called Lexan, a commercially available product. This material is strong, yet lightweight, and moldable to provide all of the lugs, bores, shafts, etc., included in the guide block means 22 in a single step. The preferred manner of forming the anvil plate 67 is to investment cast the same of metal with the bending cavities 43 with their inclined bending surfaces 45 cast therein.

When using an apparatus having several units, such as the four units shown in FIG. 18, it may be desirable to eliminate several of the handle means 28 and use only a pair (rather than four) of the handle means 28 to operate a common locking bar 190 to depress simultaneously all four upper guide block portions 50 against the bias of their respective springs 103 to clamp the eight belt fasteners, which will be within the four units illustrated in FIGS. 18 and 19, against the belt. More specifically, the common bar 190 may be a rectangular bar-shaped piece of steel merely disposed over the upper guide blocks 50 and resting on the tops of the guide locks 110 for the handle means 28. Thus, when the pair of cams 51 force the common locking bar 190 downwardly, all four upper guide blocks 50 will be moved downwardly simultaneously.

As previously described, by turning the ejector means 55, it is possible to lift all ends of the 16 staples simultaneously from their bending grooves 43. It is desirable particularly when there is a multiple use of individual units that the ejector means provides the desired force in wide application thereof to lift the bent ends 31 of the staples 27, such as shown in FIG. 10. Herein, the one piece bar is pivotally mounted in the eyes 191 of eye bolts 192 fastened to the channel 180 of the common base means 180. After being ejected, the belt end is laid on a steel plate and the central bridge 29 of the staples are hammer until bent ends 31 of the staples are flat into the pockets in the undersides of the lower fastener plates 15a, as generally illustrated in FIG. 11.

From the foregoing, it will be seen that the present invention provides a new improved apparatus which is adapted to be used with a plurality of sizes of fasteners. Clinching of the staples to the belt has been improved by bending the ends only partially and through a preferred degree of bending without bending the legs flat while in the apparatus. An ejecting means is provided for assisting in removal of the belt end and fasteners from the apparatus.

While a preferred embodiment has been shown and described, it will be understood that there is no intent to limit the invention by such disclosure but, rather, it is intended to cover all modifications and alternate constructions falling within the spirit and scope of the invention as defined in the appended claims.

I claim:

1. In an apparatus having a staple guide block means having staple guiding means therein for guiding the staples into openings in an upper belt fastener plate of a belt fastener being held and located by said guide block means relative to the staple guiding means and having an anvil means for deflecting the ends of the staples driven through a belt disposed between said guide block and said anvil means and through openings in a lower belt fastener plate with the staple legs being received within grooves in said anvil means, the improvement comprising: belt fastener locating means on said guide block means being movable in a lateral direction relative to said anvil means and said staple guiding means between a first position to engage and position a rearward end of first length of belt fastener and a second position to engage and position a rearward end of a second length of belt fastener, and means for securing said belt fastener locating means in said first and second positions.

2. An apparatus in accordance with claim 1 in which a rear guide means is positioned on said guide block means for engaging and positioning the rearward ends of said belt fasteners and is movable relative to said staple bending means between first and second positions for different sizes of belt fasteners.

3. An apparatus in accordance with claim 2 in which said rear guide means is shifted in a lateral direction between said first and second positions.

4. In an apparatus having a staple guide block means having staple guiding means therein for guiding the staples into openings in an upper belt fastener plate of a belt fastener being held and located by said guide block means relative to the staple guiding means and having an anvil means for deflecting the ends of the staples driven through a belt disposed between said guide block and said anvil means and through openings in a lower belt fastener plate with the staple legs being received within grooves in said anvil means, the improvement comprising: belt fastener locating means on said guide block means being movable relative to said anvil means between a first position to engage and position a first size of belt fastener and a second position to engage and position a second size of belt fastener, said guide block means having an upper portion having engaging means to engage and locate the upper belt fastener plate and having a lower portion and in which spacing means spaces the upper and lower portions to raise or lower said engaging means on said upper block portion depending upon the size of belt fastener being used.

5. An apparatus in accordance with claim 4 in which said spacing means comprises nestable portions on said upper and lower guide block portions which when nested lower said upper plate engaging means on said upper guide block portion, said nestable portions being shiftable to a non-nested position to engage portions of the opposite guide block portion to raise said upper plate engaging means relative to said anvil means.

6. An applicator apparatus for securing belt fasteners to the belt end with staples, said applicator apparatus comprising an anvil means having inclined anvil surfaces for deflecting the lower free ends of the staples towards the undersides of the belt fasteners, a staple guide block means mounted over said anvil means with a portion spaced from said anvil surface to admit a belt end and a plurality of belt fasteners, means mounting said staple guide block means for relative movement with respect to said anvil means between an open position admitting the belt end and belt fasteners and a closed position for holding the belt for staple application, means in said guide block means defining openings for receiving staples and for guiding the staples into openings in the belt fasteners, said guide block means comprising an upper guide block and a lower guide block, means on said upper guide block for engaging and locating an upper plate on said belt fastener, means on said lower guide block for engaging and positioning the inner ends of the belt fasteners, said upper guide block and said lower guide blocks being shiftable between a first position to engage and position a first size of belt fastener and a second position to engage and position a second size of belt fastener.

7. An apparatus in accordance with claim 6 in which said means on said lower guide block comprises a first ribbed wall on one side thereof for engaging the first size of belt fasteners and a second ribbed wall on another side of said lower guide block to engage the second size of belt fasteners.

8. In an apparatus having a staple guide block means having a staple guide means therein for guiding the staples into openings in each of a plurality of upper belt fastener plates of belt fasteners being held and located by said guide block means relative to the staple guide means and having an anvil means for deflecting the ends of the staples driven through a belt and openings in lower belt fastener plates with the staple legs being deflected and received within grooves in said anvil means beneath said lower fastener plate, the improvement comprising ejecting means mounted on said apparatus and movable from an inoperative position to an operative position for ejecting said deflected staple legs from said anvil grooves to assist in removal of said belt and said belt fasteners from said apparatus.

9. An apparatus in accordance with claim 8 in which said ejecting means comprises means mounted on said anvil means and movable from a lower position to an upper position, in which said ejecting means engages the underside of the belt and thrusts the latter upwardly relative to the anvil means to lift the deflected ends of the staples from the grooves in said anvil means.

10. An apparatus in accordance with claim 9 in which said ejecting means comprises an elongated bar located beneath the belt and means to raise the bar to engage and to lift the belt and fasteners thereon.

11. An apparatus in accordance with claim 10 in which said means to raise the bar includes crank portions on said bar mounted for turning.

12. An apparatus in accordance with claim 8 in which said apparatus comprises a plurality of staple guide block means and anvil means mounted in side-by-side relationship and in which said ejecting means extends substantially across all of said units to lift simultaneously the belt and deflected staple legs from the grooves in each of said anvil means.

13. An applicator apparatus for securing belt fasteners to the belt end with staples, said applicator apparatus comprising an anvil means having inclined anvil surfaces for deflecting the lower free end of the staples toward the undersides of the belt fasteners, a staple guide block means mounted over said anvil means with a portion spaced from said anvil surface to admit a belt end and a plurality of belt fasteners, means mounting said staple guide block means for relative movement with respect to said anvil means between an open position admitting the belt end and belt fasteners and a closed position for holding the belt for staple application, means in said guide block means defining openings for receiving staples and for guiding the staples into openings in the belt fasteners, means for holding belt fasteners against rearward movement and against forward movement and against lateral movement during staple application, and ejector means mounted on said apparatus and movable from an inoperative position to an operative position for ejecting the deflected staple ends from said inclined anvil surfaces to assist in removal of the belt and belt fasteners and staples from the staple guide block means and said anvil means.

14. In an apparatus having a staple guide block means having staple guiding means therein for guiding the staples into openings in an upper belt fastener plate of a belt fastener being held and located by said guide block means relative to the staple guiding means and having an anvil means for deflecting the ends of the staples driven through a belt disposed between said guide block and said anvil means and through openings in a lower belt fastener plate with the staple legs being received within grooves in said anvil means, the improvement comprising: belt fastener locating means on said guide block means being movable relative to said anvil means between a first position to engage and position a first size of belt fastener and a second position to engage and position a second size of belt fastener, said guide block means having an upper portion and a lower portion which are shiftable vertically and horizontally relative to said anvil means, said belt fastener locating means comprising means on said upper portion for engaging and locating the upper plate of the belt fastener, said locating means comprising means on said lower portion to engage and position the inner, rearward ends of said belt fasteners.

15. In an apparatus having a staple guide block means having staple guiding means therein for guiding the staples into openings in an upper belt fastener plate of a belt fastener being held and located by said guide block means relative to the staple guiding means and having an anvil means for deflecting the ends of the staples driven through a belt disposed between said guide block and said anvil means and through openings in a lower belt fastener plate with the staple legs being received within grooves in said anvil means, the improvement comprising: belt fastener locating means on said guide block means being movable relative to said anvil means between a first position to engage and position a first size of belt fastener and a second position to engage and position a second size of belt fastener and a rear guide means being positioned on said guide block means for engaging and positioning the rearward ends of said belt fasteners and being movable relative to said staple deflecting means between first and second positions for different sizes of belt fasteners, said rear guide means having a first slotted wall for engaging and positioning a first size of belt fastener and having a second slotted wall on an opposite side thereof to engage and position the second size of belt fastener, said rear guide means being turnable to present either one of said slotted walls depending upon the size of belt fasteners being used.

* * * * *